US012668959B1

(12) United States Patent
Ezzat Ferdman

(10) Patent No.: US 12,668,959 B1
(45) Date of Patent: Jun. 30, 2026

(54) BATH FAUCET FILTRATION SYSTEM

(71) Applicant: Jadenix LLC, Casper, WY (US)

(72) Inventor: Mandana Ezzat Ferdman, Oceanside, CA (US)

( * ) Notice: Subject to any disclaimer, the term of this patent is extended or adjusted under 35 U.S.C. 154(b) by 131 days.

(21) Appl. No.: 18/815,684

(22) Filed: Aug. 26, 2024

Related U.S. Application Data

(60) Provisional application No. 63/534,596, filed on Aug. 25, 2023.

(51) Int. Cl.
*E03C 1/04* (2006.01)
*B05B 15/40* (2018.01)

(52) U.S. Cl.
CPC ............ *E03C 1/0408* (2013.01); *B05B 15/40* (2018.02); *E03C 2201/40* (2013.01)

(58) Field of Classification Search
CPC .... E03C 1/0408; E03C 2201/40; B05B 15/40
USPC ...................................................... 4/567, 568
See application file for complete search history.

(56) References Cited

U.S. PATENT DOCUMENTS

D313,643 S 1/1991 Luzenberg, Jr.
D416,072 S 11/1999 Douglas
6,395,172 B1 * 5/2002 Koike .................... C02F 1/688 210/502.1
D462,108 S 8/2002 Farely
7,270,748 B1 9/2007 Lieggi
D675,708 S 2/2013 Smiedt
D697,170 S 1/2014 Bradford
D710,971 S 8/2014 Jackson
D846,069 S 4/2019 Zou
D852,318 S 6/2019 Lin
D857,838 S 8/2019 Pitman
D926,920 S 8/2021 Huang
11,456,919 B2 9/2022 Kancharla et al.
D967,331 S 10/2022 Lee
2006/0207920 A1 9/2006 Lackey
2008/0128349 A1 6/2008 Chen
2009/0107906 A1 4/2009 Ennis
2009/0211019 A1 8/2009 Schluttig
2010/0206799 A1 8/2010 Leavitt
2012/0055888 A1 * 3/2012 Hunter .................. A47K 3/286 210/767
2016/0236118 A1 * 8/2016 Sharratt .................. B05B 15/40
2017/0326561 A1 * 11/2017 Sharratt .................. B05B 15/40
2020/0377384 A1 * 12/2020 Farley .................. E03C 1/0408

* cited by examiner

*Primary Examiner* — Huyen D Le
(74) *Attorney, Agent, or Firm* — Goldstein Law Offices, P.C.

(57) ABSTRACT

A bath faucet filtration system for purifying bath water includes a bath faucet which is retrofit into an existing shower/bath, a filter assembly, and a filter assembly replacement tool. The bath faucet includes a main cylindrical body, two internal cavities that are in fluid communication with each other, at least one support rib, and an internal threaded reducer. The filter assembly is selectively attached to the bath faucet with an external thread on its housing. The filter assembly includes a housing with a plurality of apertures and an internal filter. The filter assembly replacement tool helps remove and attach the filter assembly to the bath faucet. It includes a series of protrusions to lock onto the filter assembly's apertures and at least one arm disposed on a wall. When the filter assembly requires changing, the user is notified by an indicator.

20 Claims, 11 Drawing Sheets

BATH FAUCET FILTRATION SYSTEM

CROSS-REFERENCE TO RELATED APPLICATIONS

This application claims the benefit of priority of U.S. Provisional Patent Application Ser. No. 63/534,596, filed on Aug. 25, 2023, the contents of which are relied upon and incorporated herein by reference in their entirety.

TECHNICAL FIELD

The present disclosure relates generally to bath faucet filters. More particularly, the present disclosure relates to bath faucet filters that purify bathing water.

BACKGROUND

Unfiltered bath water often contains harmful chemicals and minerals, some of which include chlorine, calcium, and magnesium. Many of these chemicals and minerals can lead to irritated skin, dry hair, and weakened nails. Unfiltered bathing water may strip the hair of its natural oils and amplify skin irritations like eczema. Furthermore, minerals such as calcium and magnesium can break down layers of keratin which form nails. When children take baths, they are exposed to these chemicals and minerals, as well as their harmful consequences.

Additionally, the minerals and chemicals contained in unfiltered bath water may enter the bloodstream by absorption through the skin or inhalation into the lungs. This may lead to internal health issues, such as respiratory problems.

Currently, products for filtering bathing water are generally limited to systems that hang off the bath faucet. Bath water then enters these systems from the faucet and is filtered before filling the tub. These products often are in the user's way while bathing and may be easily dislodged thus allowing unfiltered water to enter the tub. In addition, these products must be aligned perfectly beneath the bath faucet mouth otherwise unfiltered water may enter the bath. While these units may be suitable for the particular purpose employed, or for general use, they would not be as suitable for the purposes of the present disclosure as disclosed hereafter.

Accordingly, there is a need for a bath faucet filtration system that will remain in place and not be able to be easily dislodged. There is also a need for a bath faucet filtration system that does not obstruct the bath and is easily replaceable when the filter expires. Such a bath faucet filtration system would thereby provide efficiently filtered bathing water.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

One aspect of an example embodiment in the present disclosure is to provide a bath faucet filtration system for purifying bath water. Accordingly, the present disclosure provides a bath faucet which can be retrofit into an existing shower and includes a removable filter and a filter assembly replacement tool. The bath faucet includes a main cylindrical body with a first internal cavity and a second internal cavity, wherein the second internal cavity is adjacent to the first internal cavity. The main cylindrical body also includes a first proximal end and a first distal end. The first distal end includes a bath faucet mouth, and the first proximal end is adjacent to an internal threaded reducer. The first internal cavity is in fluid communication with the first proximal end, the second internal cavity is in fluid communication with the first distal end. The first internal cavity is in fluid communication with the second internal cavity.

The main cylindrical body includes a horizontal portion and a downward portion to direct the bath water into the removable filter. The horizontal portion and the downward portion are connected with an axial bend. The horizontal portion is adjacent to the proximal end and includes the first internal cavity. The downward portion is adjacent to the distal end and includes the second internal cavity. The second internal cavity's diameter is greater than the first internal cavity and is substantially equal to the bath faucet mouth.

The downward portion further includes an internal thread for attaching the removable filter. The internal thread is disposed on the inner surface of the downward portion and is adjacent to the first distal end. The bath faucet mouth is adjacent to the distal end.

The horizontal portion further includes an outer tubular member, an inner tubular member defining the first internal cavity, and at least one support rib to support the structure of the horizontal portion. At least one support rib connects the outer surface of the first internal cavity to the inner surface of the outer tubular member. The inner surface of the first internal cavity includes an internal thread to attach the bath faucet filtration system to a tub pipe.

The removable filter is selectively attached to the inner surface of the bath faucet mouth with the purpose of purifying bathing water. The removable filter consists of a semi-spherical end, a water release end, and a filter cylindrical body. The filter cylindrical body further consists of an internal cavity, an internal filter, and a timer. The filter cylindrical body extends from the semi-spherical end to the water release end. The filter internal cavity is disposed within the filter internal body and expands from the semi-spherical end to the water release end. The semi-spherical end and the water release end both have at least one aperture. The water release end further includes a perimeter edge and at least one recess disposed on the perimeter edge. The filter internal cavity is in fluid communication with the apertures of the water release end and the semi-spherical end. The internal filter includes a plurality of stacked filtering layers for cleansing the bath water.

The filter cylindrical body includes an external thread for the purposes of attaching to the internal threads disposed on the inner surface of the downward portion. The external thread is adjacent to the water release end.

The water release end comprises a lip and a gasket for the purpose of preventing leakage. The lip is adjacent to the water release end and has a diameter greater than the bath faucet mouth and greater than the cylindrical body. The gasket is positioned between the lip and the external thread. The water release end further comprises a perimeter edge, one or more recesses disposed on the perimeter edge, a central recess, and a transparent plate. The transparent plate covers the central recess. The central recess houses the filter timer and the indicator. The filter timer is coupled with the internal filter and the indicator is coupled to the filter timer. The indicator notifies a user to replace the filter once a predetermined amount of time has passed.

The filter assembly replacement tool removes and attaches the removable filter to the bath faucet. The filter assembly replacement tool includes a tool water release end, a bottom edge, a wall, and at least one arm. The tool water release end further includes a tool outer surface and a tool inner surface. The tool inner surface includes at least one protrusion to engage the recesses. The wall further includes a wall inner surface and a wall outer surface.

The filter assembly replacement tool further comprises a socket to lock onto the water release end of the removable filter. The planner inner surface and the wall inner surface comprises the socket.

The filter assembly replacement tool further comprises at least one arm for the purpose of making it easier to remove or attach the removable filter. The arm is disposed on the wall of the outer surface.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

Figure 1:
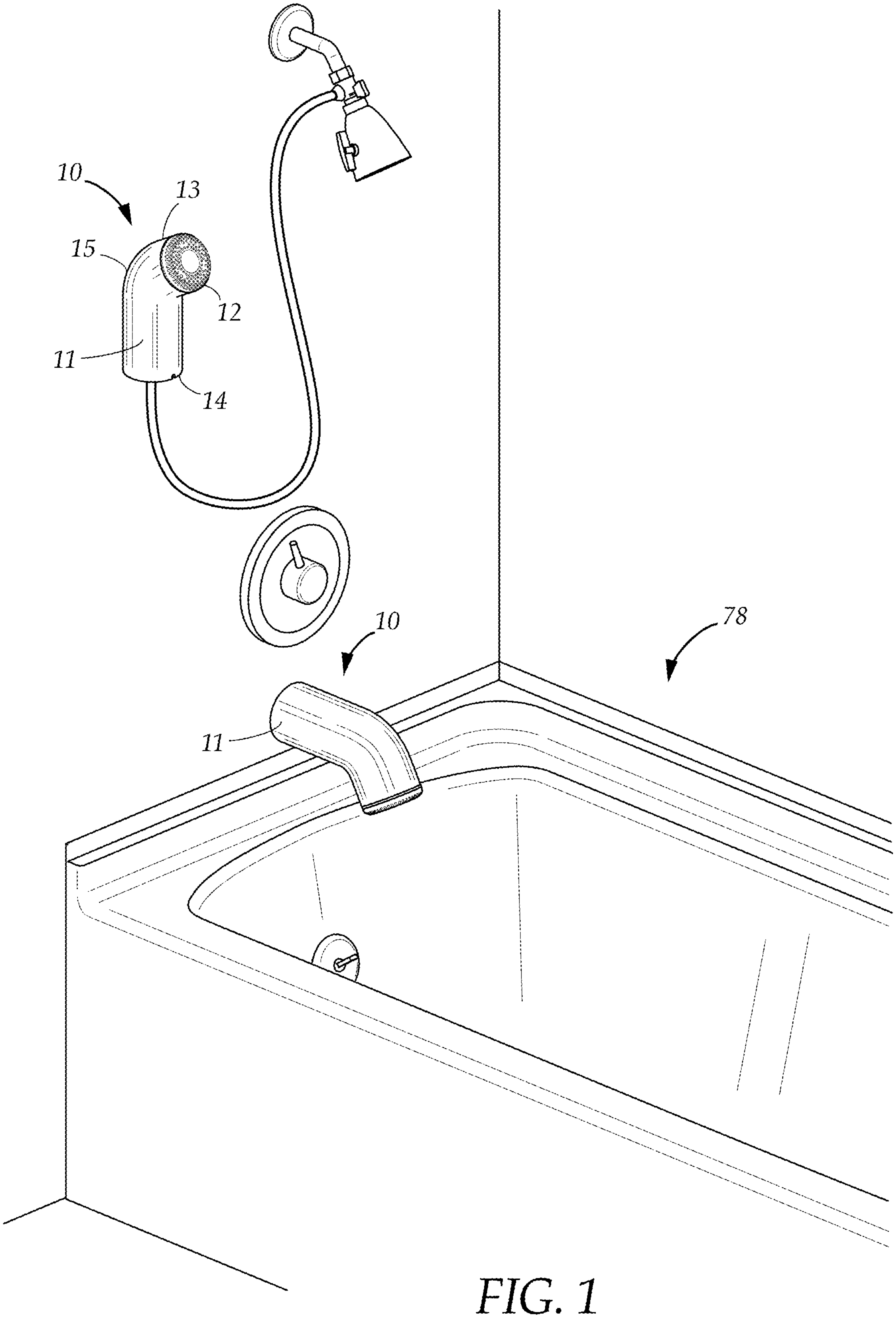
FIG. 1 shows a perspective view of a bath faucet filtration system installed on a shower, illustrating its use as a bath faucet as well as a handheld shower head in accordance with one embodiment of the present disclosure.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

As discussed above, unfiltered bath water often consists of harmful chemicals and minerals. When children bathe, they are exposed to these chemicals and minerals. While various attempts have been made to address this issue, these solutions are impractical. For example, filtration systems that hang off the bath faucet are easily knocked out of place and often get in the way. The embodiments disclosed herein address these and other issues.

Referring to FIG. 1, FIG. 4, FIG. 5, and FIG. 9, the present disclosure provides a bath faucet filtration system 10 for purifying bathing water as it enters a bathtub 78. The bath faucet filtration system 10 includes a bath faucet 11 which can be retrofit into an existing shower or bath and a removable filter 12 for purifying water flowing through the bath faucet 11. The bath faucet 11 includes a first distal end 13, a first proximal end 14, and a main cylindrical body 15. The main cylindrical body 15 includes a first internal cavity 17 and a second internal cavity 19 in fluid communication with the first internal cavity 17. In embodiments, the first internal cavity 17 is angled, or branched, with respect to the second internal cavity 19. The first internal cavity 17 is in fluid communication with the first proximal end 14. The second internal cavity 19 is in fluid communication with the first distal end 13. An internal threaded reducer 16 is adjacent to the first proximal end 14 for attaching the bath faucet 11 to a tub pipe 80.

Figure 3:
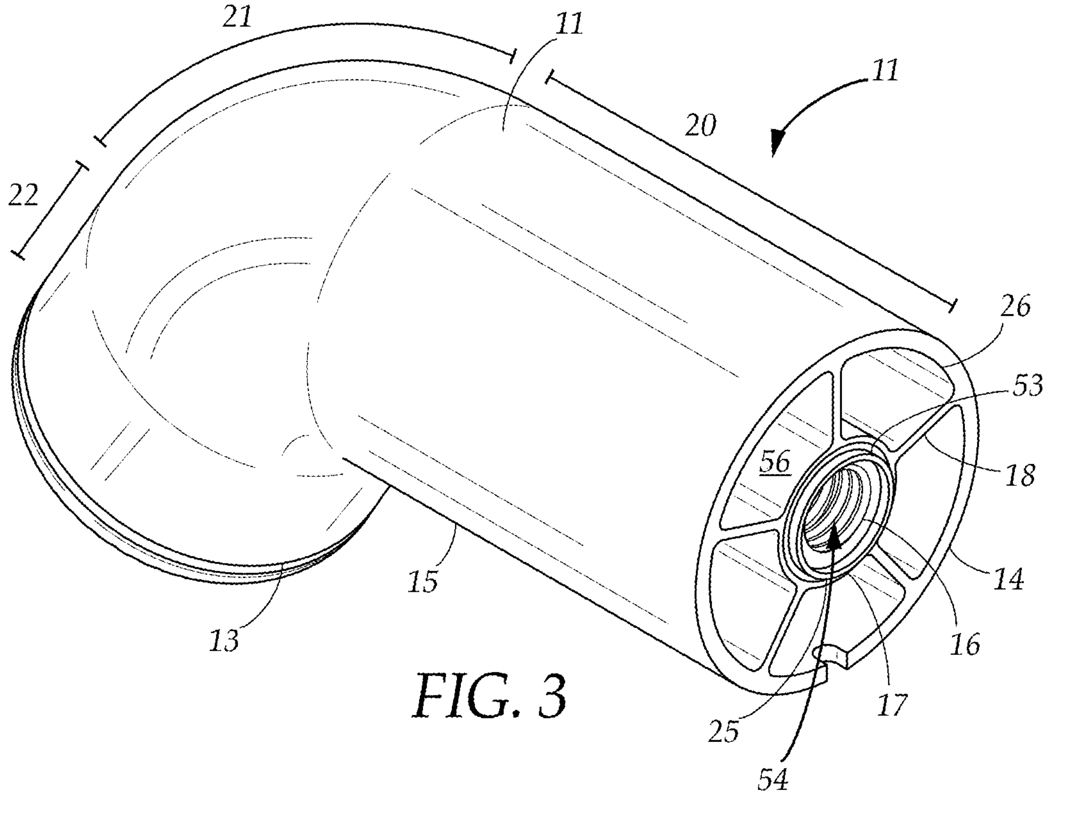
FIG. 3 shows a top perspective view of a bath faucet filtration system, illustrating the support rib and the internal threaded reducer in accordance with one embodiment of the present disclosure.
Figure 5:
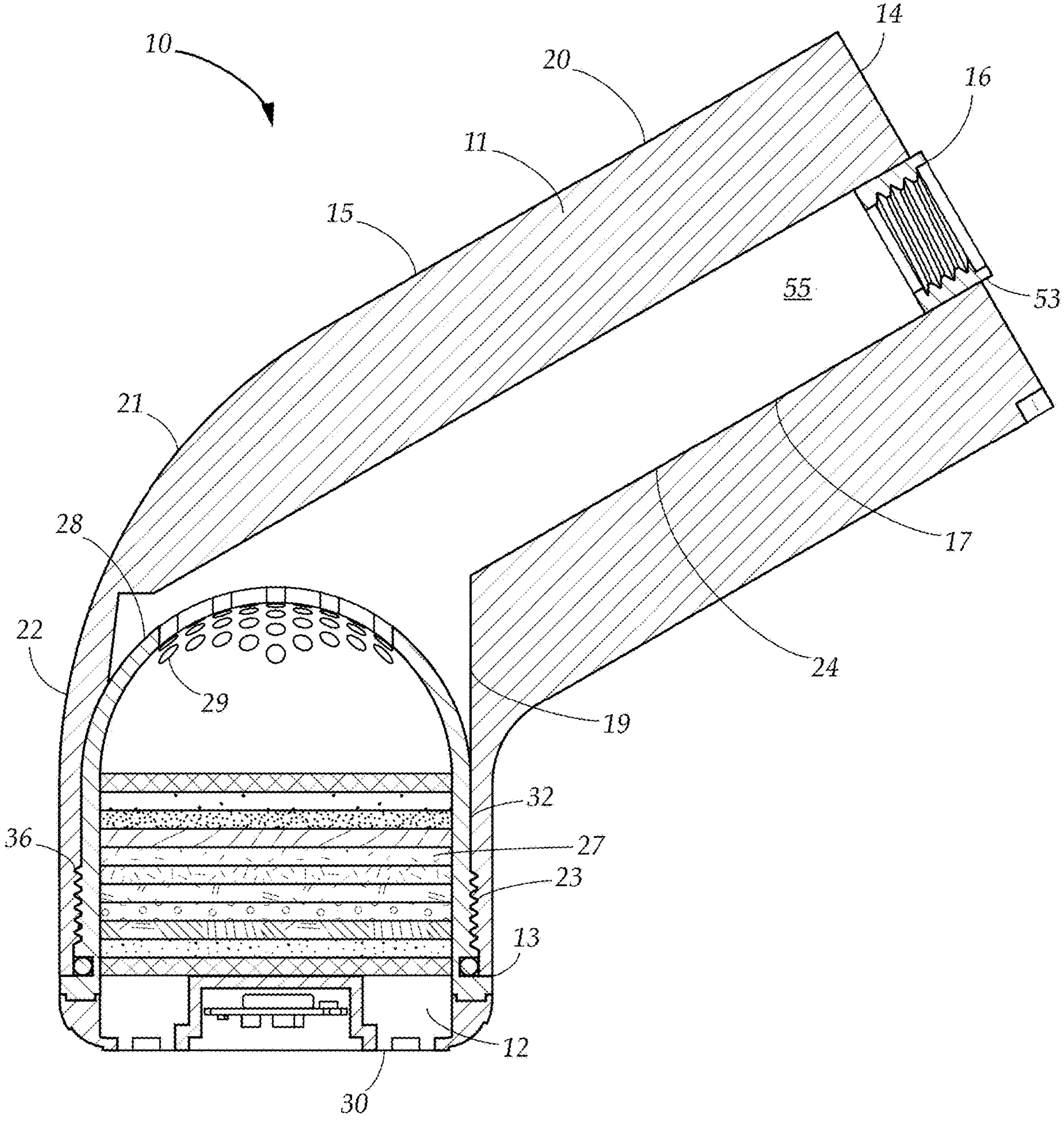
FIG. 5 is a cross-sectional view of the bath faucet filtration system of FIG. 2 taken along lines 1-1 of FIG. 2, illustrating the configuration of the components within the bath faucet filtration system in accordance with one embodiment in the present disclosure.
Figure 8:
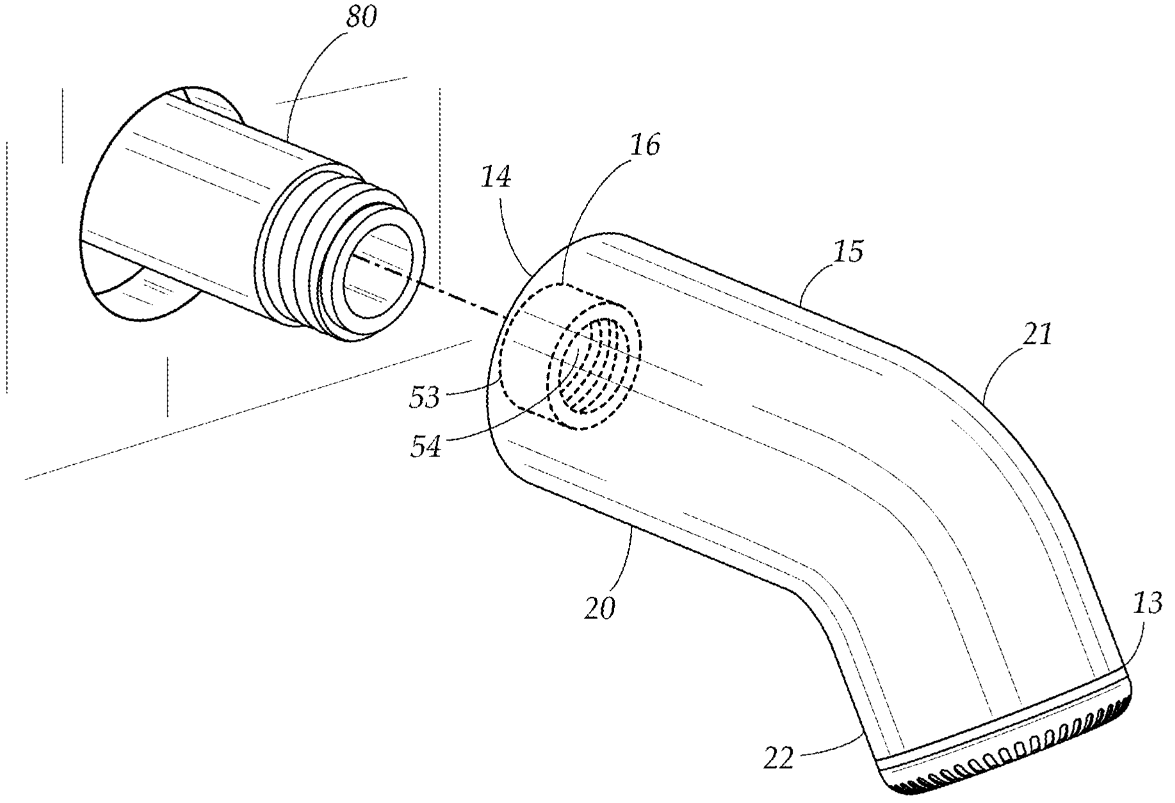
FIG. 8 is a top perspective view of the bath faucet filtration system attaching to the tub pipe, illustrating one manner in which the bath faucet filtration system may be installed according to one embodiment of the present disclosure.

Referring now to FIG. 3, FIG. 5 and FIG. 8, the main cylindrical body 15 further includes a horizontal portion 20, an axial bend 21, and a downturned portion 22. The horizontal portion 20 is adjacent to the first proximal end 14 and transitions into the axial bend 21. The axial bend 21 transitions into the downturned portion 22. The downturned portion 22 is adjacent to the first distal end 13. The proximal end 14 includes a perimeter edge 53 which defines a first opening 54 to the first internal cavity 17. The internal threaded reducer 16 is adjacent to the perimeter edge 53. In embodiments, the internal threaded reducer 16 includes a portion that protrudes from the proximal end 14. The horizontal portion 20 includes the first internal cavity 17 and the downturned portion 22 includes the second internal cavity 19.

The horizontal portion 20 includes an outer tubular member 26, an inner tubular member 24, and at least one support rib 18. The inner tubular member 24 defines the first internal cavity 17 and has an inner surface 55 and outer surface 56. The inner surface 55 includes the internal threaded reducer 16. At least one support rib 18 connects the outer surface 56 of the inner tubular member 24 to the inner surface 55 of the outer tubular member 26. The support rib 18 extends radially from the outer tubular member 26 to the inner tubular member 24 and longitudinally along the length of the horizontal portion 20. The support rib 18 provides structural support to the bath faucet 11.

Referring back to FIG. 4 and FIG. 5, the downturned portion 22 includes an internal thread 23 and an inner surface 57. The internal thread 23 is disposed on the inner surface 57. The internal thread 23 is used to attach the removable filter 12 to the bath faucet 11. The internal thread 23 is adjacent to the first distal end 13. The first distal end 13 includes a perimeter edge 58 defining a second opening providing access to the second internal cavity 19. The second opening further defines the bath faucet mouth 68. The second internal cavity 19 has a diameter that is greater than a diameter of the first internal cavity 17 and substantially equal to a diameter of the bath faucet mouth 68. The filter assembly 12 includes a housing 59 containing an internal filter 27 for filtering and purifying water passing through the filter assembly 12. The housing 59 includes a semi-spherical end 28 with one or more first apertures 29, a water release end 30 with one or more second apertures 31, and a cylindrical body 32. The cylindrical body 32 extends from the semi-spherical end 28 to the water release end 30 and includes an inner surface 60. The inner surface 60 of the cylindrical body 32, the semi-spherical end 28, and the water release end 30 define a filter internal cavity 33. The filter internal cavity 33 is in fluid communication with the first apertures 29 and the second apertures 31.

The internal filter 27 is located within the filter internal cavity 33. The internal filter 27 is made of a plurality of stacked filtering layers including germanium ceramic balls, maifan stone, KDF 55, high energy ceramic balls, dichlorination balls, activated carbon, far infrared mineralized balls, vitamin C balls, calcium sulfite, magnetic energy balls, high-density metal mesh, polypropylene cotton and/or any other suitable material or combination of materials. In embodiments, the internal filter includes a 15-stage water filter, including 15 layers of any combination of the above-mentioned filtering material layers that each individually filter and purify water passing therethrough. In some embodiments, the polypropylene cotton is stacked atop the high-density metal mesh both on the top and the bottom of the internal filter 27.

An exterior thread 36 is disposed on the cylindrical body's 32 outer surface 61 and is used to removably attach the filter assembly 12 to the downward portion 22 of the bath faucet 11. When attached, the filter assembly 12 expands substantially throughout the second internal cavity 19 with the first apertures 29 substantially aligned at the juncture which the first internal cavity 17 meets the second internal cavity 19. The exterior thread 36 is adjacent to the water release end 30. The cylindrical body 32 further includes a lip 37 extending annularly around the exterior surface of the cylindrical body 12. The lip 37 includes a diameter greater than the bath faucet mouth 68 opening and greater than the cylindrical body 32 to prevent water leakage and prevent the filter assembly 12 from entering entirely into the downturned portion 22. The filter assembly 12 includes a gasket 38 that is positioned between the external thread 36 and the lip 37.

Figure 2:
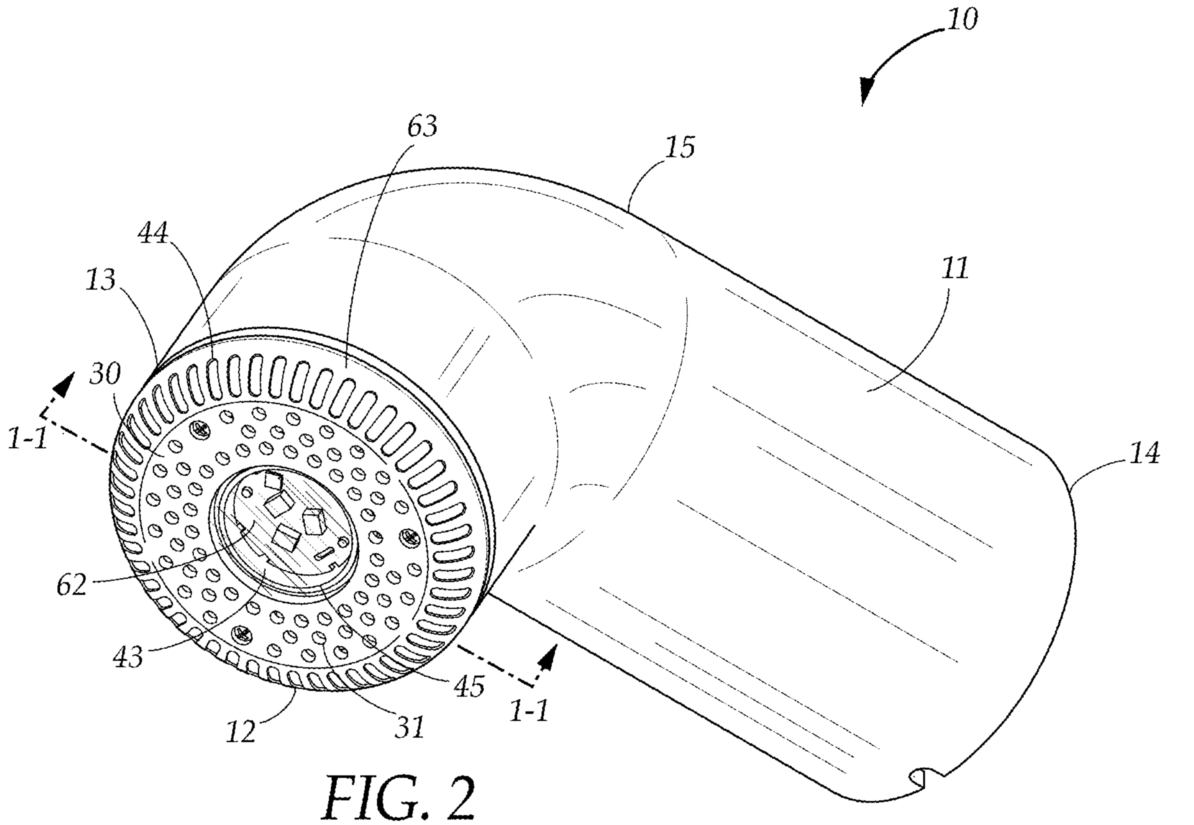
FIG. 2 shows a bottom perspective view of a bath faucet filtration system, illustrating the water release end and the indicator disposed within the recess of the water release end in accordance with one embodiment of the present disclosure.
Figure 4:
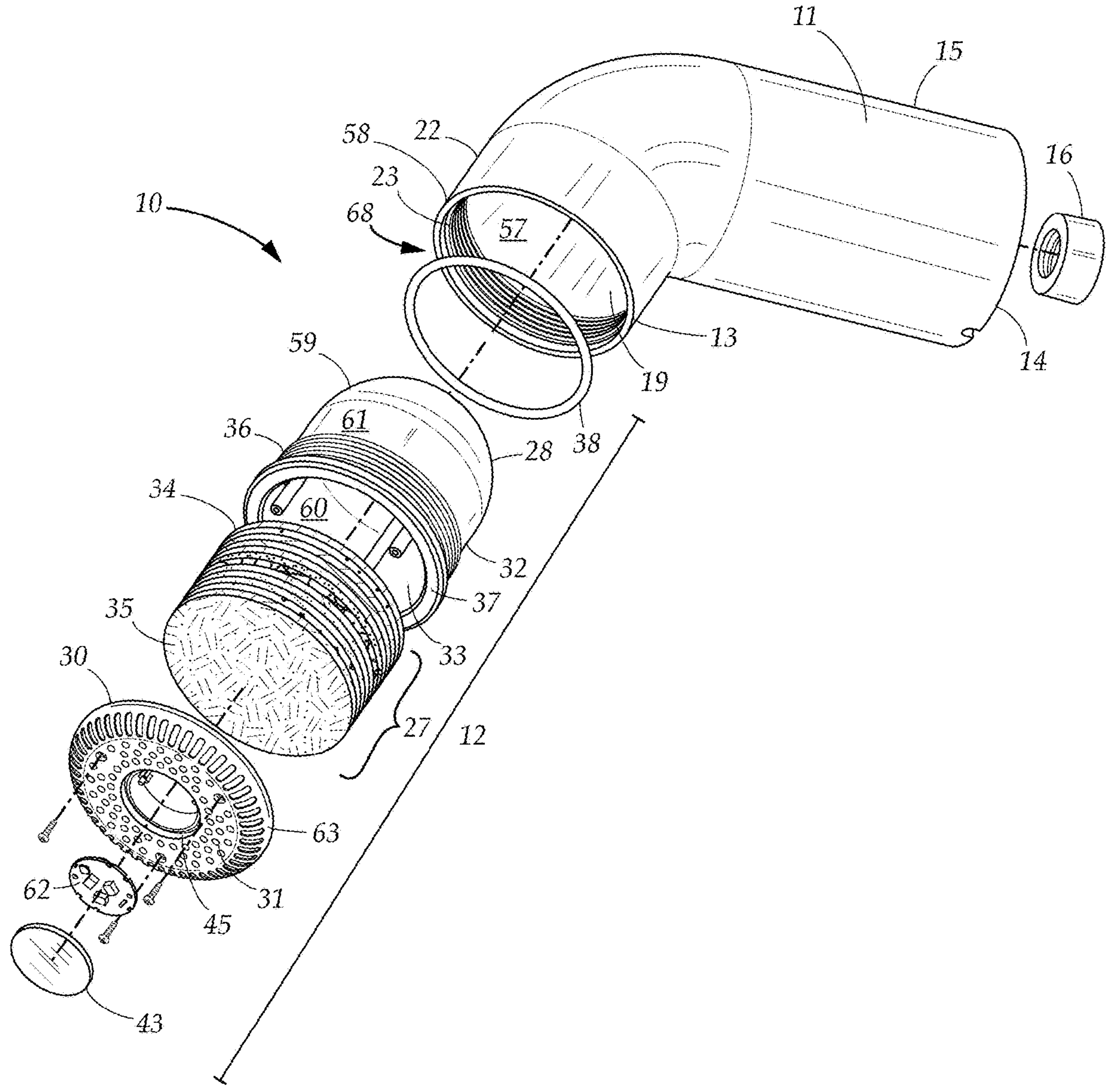
FIG. 4 shows an exploded perspective view of the bath faucet filtration system, illustrating the components of the bath faucet filtration system in accordance with one embodiment of the present disclosure.
Figure 6:
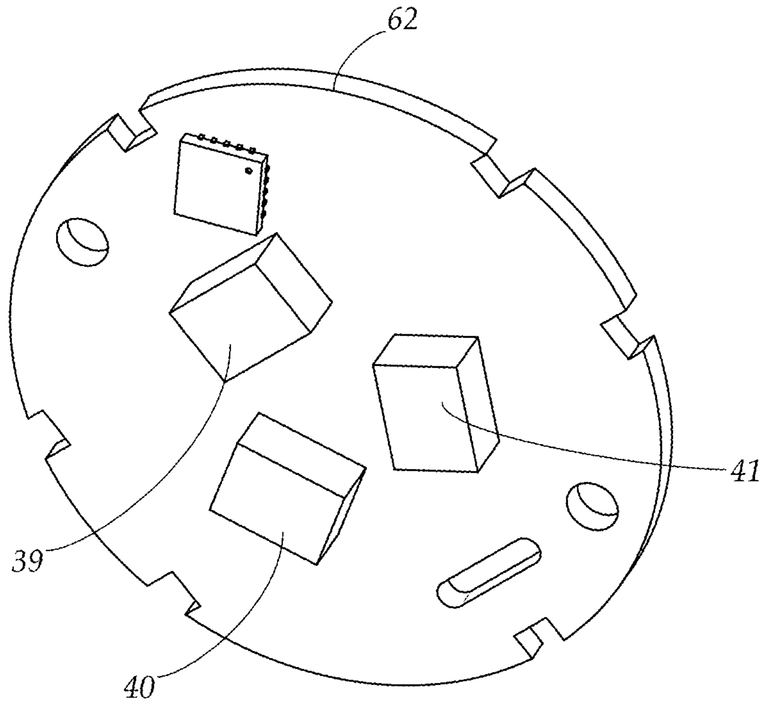
FIG. 6 is a bottom perspective view of the indicator module, illustrating the processor, filter timer, sensor, and indicator in accordance with one embodiment of the present invention.
Figure 7:
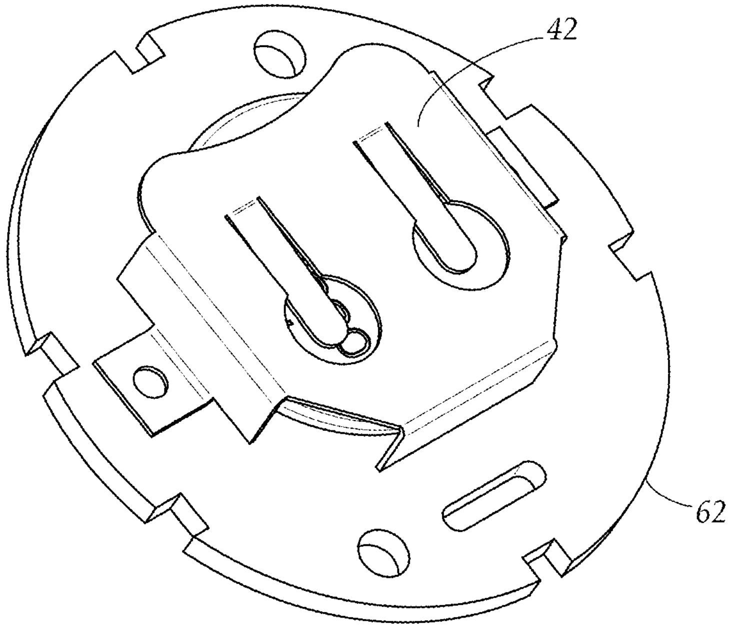
FIG. 7 is a top perspective view of the indicator module, illustrating the power source in accordance with one embodiment of the present invention.

Referring now FIG. 2, FIG. 6, and FIG. 7, in conjunction with FIG. 4, the water release end 30 includes a recess 45 which houses an indicator module 62 including a filter timer 39, an indicator 40, a sensor 41, and a power source 42. The filter timer 39, the indicator 40, and the sensor 41 are in operable communication with the power source 42. The filter timer 39 and the sensor 41 are each coupled to the indicator 40. The filter timer 39 tracks a predetermined amount of time the filter assembly 12 has been in use and once that time has passed, the filter timer 39 triggers the indicator 40, which notifies a user that the filter assembly 12 requires replacement. The indicator 40 may be a visual indicator such as a light or an audio indicator such as an alarm or repetitive sound. In some embodiments, the sensor 41 senses the amount of water passing through the filter assembly 12 in order to determine that the filter assembly 12 needs to be replaced based on a predetermined quantity of water that has passed through the internal filter 27. When the sensor 41 determines that the predetermined amount of water has passed through the filter assembly 12, the sensor 41 will trigger the indicator 40 to notify a user that the filter assembly 12 requires replacement.

In other embodiments, the sensor 41 senses the quality or state of the internal filter 27 or water passing through the internal filter 27 in order to determine that the filter assembly 12 needs to be replaced based on poor water quality or the internal filter 27 quality. If the sensor 41 determines that the quality of the water passing through the internal filter 27 is poor or that the internal filter 27 quality is poor, then the sensor 41 will trigger the indicator 40 to notify a user that the filter assembly 12 requires replacement. The recess 45 is covered with a transparent plate 43. The second apertures 31 are disposed annularly around the recess 45, between the recess 45 and a perimeter edge 63 of the water release end 30. A series of third apertures 44 are disposed along the perimeter edge 63 of the water release end 30 and also extend annularly around the recess 45. The second apertures 31 are positioned between the third apertures 44 and the recess 45. In some embodiments, the third apertures 44 are oblong in shape and the second apertures 31 are circular in shape. In some embodiments, the third apertures 44 are larger in size, or area, than the second apertures 31.

Figure 9:
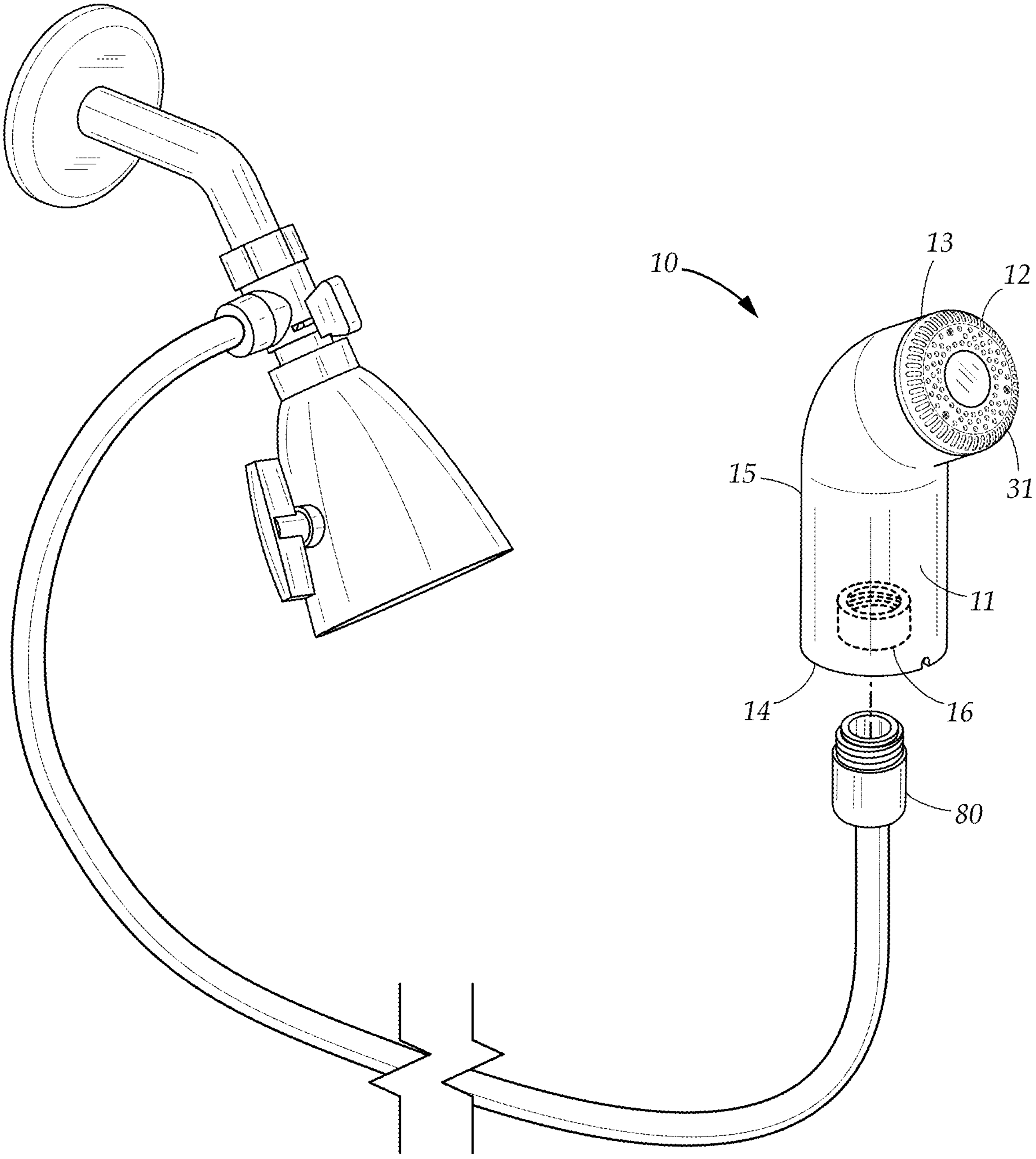
FIG. 9 shows a perspective view of the bath faucet filtration system attached to the shower head hand shower hose, illustrating one manner in which the bath faucet filtration system may be installed according to one embodiment of the present disclosure.
Figure 10:
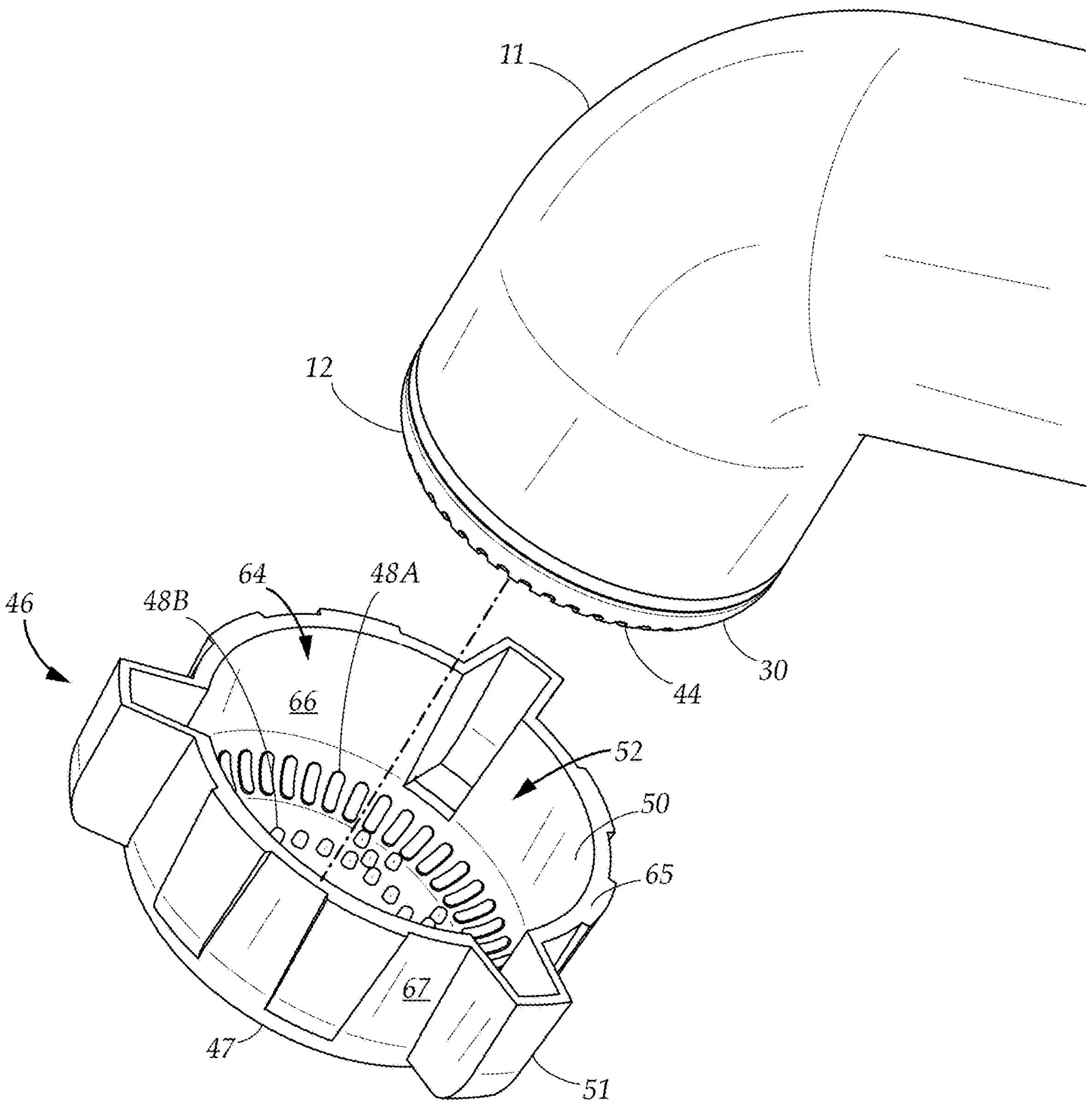
FIG. 10 shows a close-up perspective view of the bath faucet and replacement tool of the bath faucet filtration system, illustrating one manner in which the replacement tool aligns with the bath faucet to be engaged therewith in accordance with one embodiment of the present disclosure.
Figure 11:
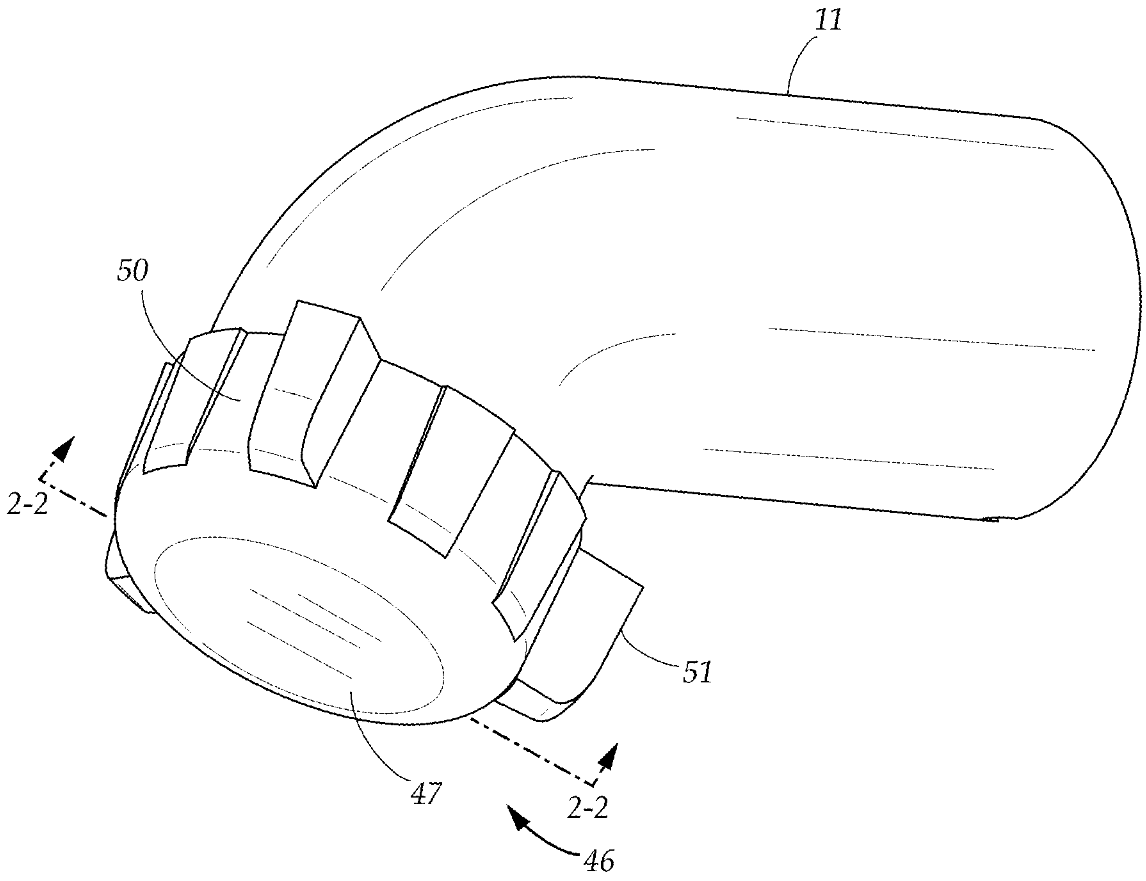
FIG. 11 shows a perspective view of the replacement tool attached to the bath faucet of the bath faucet filtration system, illustrating the replacement tool engaged with the water release end to remove the removable filter from the bath faucet according to one embodiment of the present disclosure.
Figure 12:
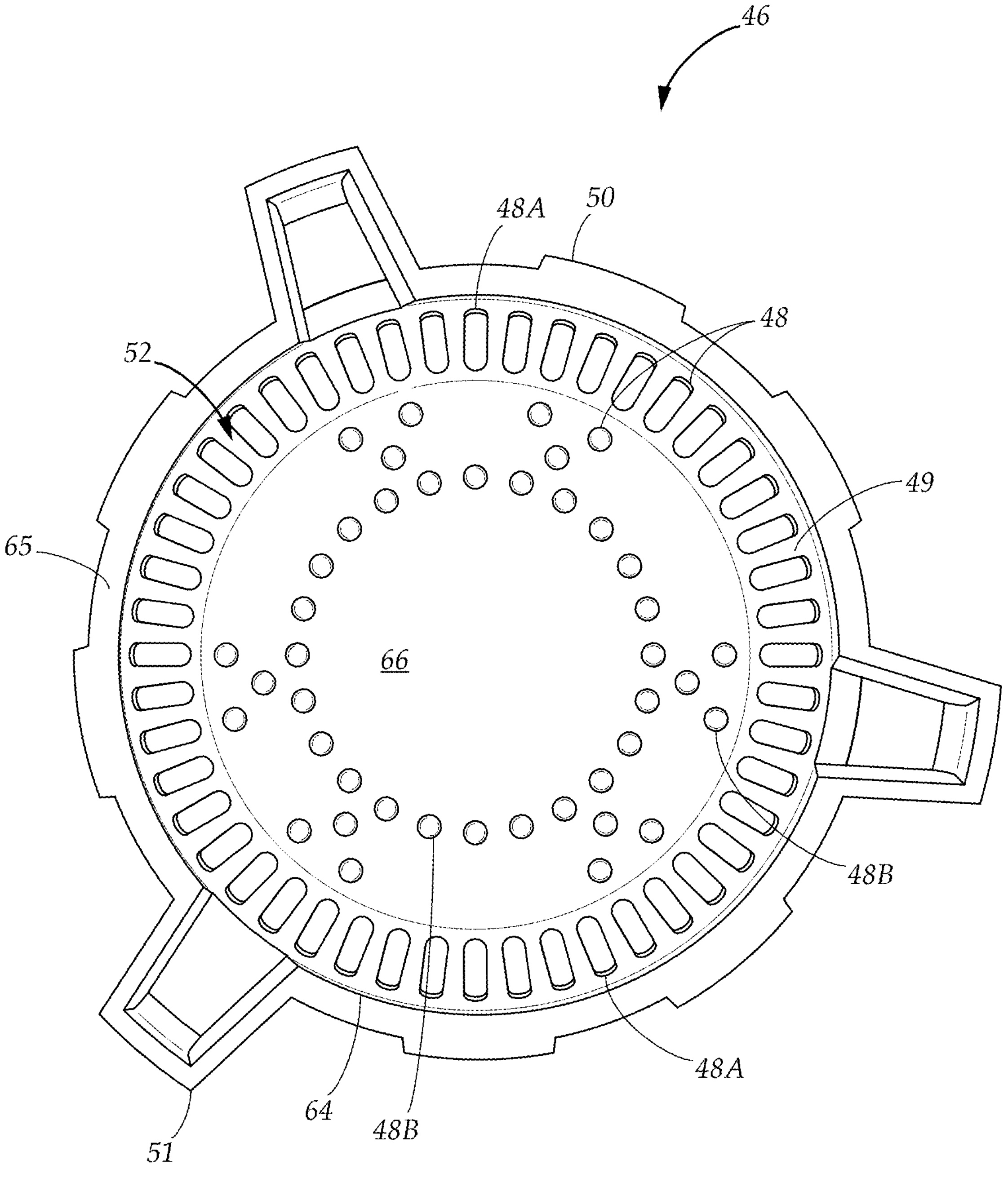
FIG. 12 shows a top plan view of the interior of the replacement tool, illustrating the socket and engagement protrusions according to one embodiment of the present disclosure.
Figure 13:
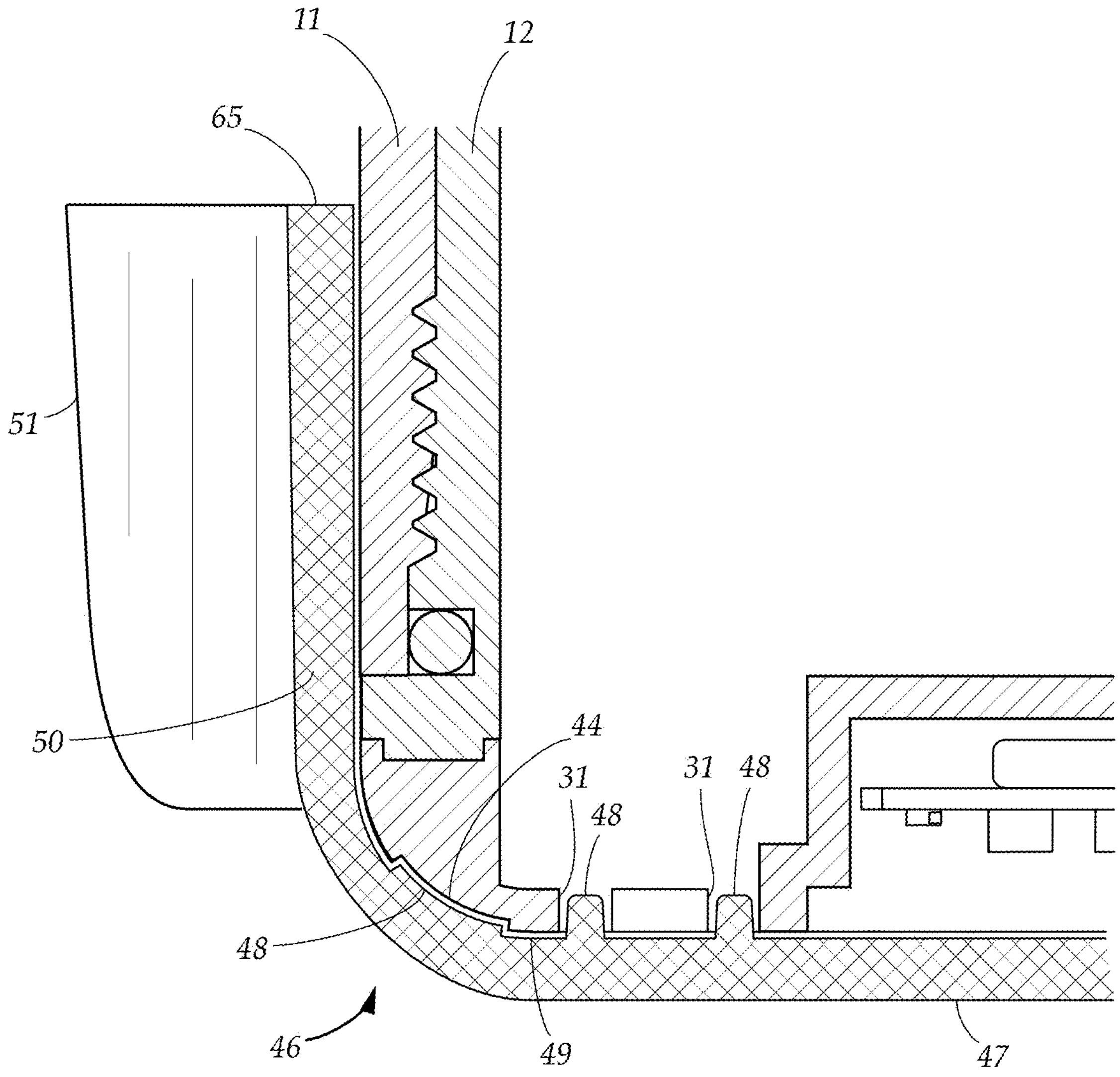
FIG. 13 is a cross-sectional view of the bath faucet filtration system of FIG. 11 taken along line 2-2 in FIG. 11, illustrating the replacement tool attached to the bath faucet filtration system in accordance with one embodiment in the present disclosure.

Referring now to FIGS. 10, 11, 12, and 13, in conjunction with FIG. 9, a filter assembly replacement tool 46 may be used to remove and attach the filter assembly 12 to the bath faucet 11. The filter assembly replacement tool 46 includes a closed end 47, an open upper end 64, a sidewall 50 extending between the closed end 47 and the open upper end 64, and interior volume defining a socket 52 for receiving the water release end 30 of the filter assembly 12. The open upper end 64 defines a perimeter edge 65 providing access to socket 52. The socket 52 includes an interior surface 66 including a bottom edge 49 and one or more protrusions 48A, 48B. The sidewall 50 includes at least one arm 51 disposed on its outer surface 67 and extending radially outwardly for enabling a user to grip the filter assembly replacement tool 46. The protrusions 48A correspond in position, shape, and size to the third apertures 44 found on the water release end 30 of the filter assembly 12. The protrusions 48B correspond in position, shape, and size to the second apertures 31 on the water release end 30 of the filter assembly 12. In operation, to remove or tighten the filter assembly 12 from the bath faucet 11, the socket 52 is placed on top of the water release end 30 of the filter assembly 12, as illustrated in FIG. 10, and the protrusions 48A, 48B engage the second apertures 31 and third apertures 44. In this way, the filter assembly replacement tool 46 locks onto the filter assembly 12 to either remove it from the bath faucet 11 or tighten it thereon, as illustrated in FIG. 13.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly. The term "substantially" is defined as at least 95% of the term being described and/or within a tolerance level known in the art and/or within 5% thereof.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a bath faucet filtration system. The disclosure is illustrated by example in the drawing figures, and throughout the written description. It should be understood that numerous variations are possible, while adhering to the inventive concept. Such variations are contemplated as being a part of the present disclosure.

What is claimed is:

1. A bath faucet filtration system to purify bathing water, comprising:

a bath faucet including an inner surface, an outer surface opposite the inner surface, a main cylindrical body with a first internal cavity, a second internal cavity adjacent to the first internal cavity, and an internal threaded reducer, the main cylindrical body further comprising a first proximal end and a first distal end including a bath faucet mouth, the internal threaded reducer adjacent to the first proximal end, the first internal cavity in fluid communication with the first proximal end, the second internal cavity in fluid communication with the first distal end, the first internal cavity in fluid communication with the second internal cavity;

a removable filter selectively attachable to the inner surface of the bath faucet mouth, the removable filter comprising a semi-spherical end including one or more first apertures, a water release end including one or more second apertures, a perimeter edge, and one or more recesses disposed on the perimeter edge, the removeable filter further including a filter cylindrical body with an internal cavity and an internal filter, the internal cavity extending from the semi-spherical end to the water release end, the internal cavity in fluid communication with the first apertures and the second apertures, the internal filter disposed in the filter internal cavity and expanding from the semi-spherical end to the water release end.

2. The bath faucet filtration system of claim 1, wherein:

the main cylindrical body further comprises a horizontal portion which has an axial bend transition into a downturned portion, the horizontal portion is adjacent to the first proximal end and the downturned portion is adjacent to the first distal end; and the horizontal portion includes the first internal cavity, and the downturned portion includes the second internal cavity, the second internal cavity includes a diameter greater than the first internal cavity and substantially equal to the bath faucet mouth.

3. The bath faucet filtration system of claim 2, wherein the downturned portion further comprises an internal thread disposed on the inner surface for attaching the removable filter, the internal thread is adjacent to the first distal end.

4. The bath faucet filtration system of claim 2, further comprising an indicator for notifying a user to replace the filter once a predetermined amount of time has passed or a predetermined amount of water has passed through the filter.

5. The bath faucet filtration system of claim 1, wherein the horizontal portion includes an outer tubular member, an inner tubular member defining the first internal cavity, and at least one support rib, the outer tubular member including an inner surface and an outer surface, the inner tubular member including an inner surface and an outer surface wherein the inner surface further comprises the internal threaded reducer to attach to the tub pipe, the at least one rib connecting the outer surface of the inner tubular member to the inner surface of the outer tubular member for structural support.

6. The bath faucet filtration system of claim 1, wherein the filter cylindrical body further comprises an external thread for removably engaging the internal thread of the down-turned portion, the external thread adjacent to the water release end.

7. The bath faucet filtration system of claim 1, wherein the first apertures align with the first internal cavity where the first internal cavity meets the second internal cavity.

8. The bath faucet filtration system of claim 1, wherein the internal filter further comprises a plurality of stacked filtering layers for cleansing bath water.

9. The bath faucet filtration system of claim 8, the plurality of stacked filtering layers further comprises one or more polypropylene cotton including a plurality of third apertures and one or more high-density metal mesh, wherein the polypropylene cotton stacked atop the high-density metal mesh.

10. The bath faucet filtration system of claim 8, the plurality of stacked filtering layers further comprises germanium ceramic balls, maifan stone, KDF 55, high energy ceramic balls, dichlorination balls, activated carbon, far infarred mineralized balls, vitamin C balls, calcium sulfite, and magnetic energy balls.

11. The bath faucet filtration system of claim 1, wherein the bath faucet filtration system further includes a filter assembly replacement tool for removing and attaching the filter assembly comprising a tool water release end including a tool outer surface, a tool inner surface, and one or more protrusions on the tool inner surface to engage the recesses, the filter assembly replacement tool further comprises a bottom edge, a sidewall including a wall inner surface and a wall outer surface, and at least one arm.

12. The bath faucet filtration system of claim 11, wherein the filter assembly replacement tool further comprises a socket for locking onto the water release end of the removable filter.

13. The bath faucet filtration system of claim 11, wherein the sidewall extends from the tool water release end to the bottom edge, the tool inner surface and wall inner surface defines the socket, the arm disposed on the sidewall outer surface.

14. A filter assembly for attachment to a bath faucet having a mouth, the mouth having a mouth opening that is internally threaded, comprising:

a housing including an outer surface, an inner surface, a semi-spherical end including one or more first apertures for allowing water therethrough, a water release end including one or more second apertures for allowing water therethrough, the semi-spherical end opposite the water release end, a cylindrical body extending from the semi-spherical end to the water release end, and a filter internal cavity extending from the semi-spherical end to the water release end, the filter internal cavity in fluid communication with the first apertures and the second apertures;

an internal filter including a proximal end and a distal end, the internal filter disposed within the filter internal cavity, the proximal end adjacent to the semi-spherical end and the distal end adjacent to the water release end, the internal filter further comprising a plurality of stacked filtering layers for cleansing bath water.

15. The filter assembly for a bath faucet of claim 14, wherein the outer surface of the housing further comprises an exterior thread, the exterior thread is adjacent to the water release end and used to secure the filter assembly to the bath faucet mouth such the filter may be removably attached to the bath faucet.

16. The filter assembly for a bath faucet of claim 14, wherein:

the bath faucet mouth opening has an internal diameter; and wherein the filter assembly further comprises a lip having a diameter greater than the bath faucet mouth opening and greater than the cylindrical body such that the lip prevents leakage, the lip is attached at the water release end of the cylindrical body.

17. The filter assembly for a bath faucet of claim 14, wherein the filter assembly further comprises a gasket positioned between the external thread and the lip.

18. The filter assembly for a bath faucet of claim 14, wherein the filter further comprises:

a filter timer, for tracking a predetermined amount of time the filter assembly has been in use wherein the filter timer is coupled with the internal filter;

an indicator coupled to the filter timer for notifying a user to replace the filter once the predetermined amount of time has passed.

19. The filter assembly for a bath faucet of claim 14, wherein the water release end further includes a recess and a transparent plate, the recess center of the water release end, the second apertures are in a circular position around the recess, the transparent plate covers the recess.

20. The filter assembly for a bath faucet of claim 19, wherein the filter timer and the indicator are disposed inside the recess.

* * * * *